(12) United States Patent
Horiuchi et al.

(10) Patent No.: US 9,857,553 B2
(45) Date of Patent: Jan. 2, 2018

(54) LENS UNIT AND IMAGING DEVICE

(71) Applicant: NIDEC SANKYO CORPORATION, Suwa-gun, Nagano (JP)

(72) Inventors: Kohei Horiuchi, Nagano (JP); Tomoaki Nakajima, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/117,543

(22) PCT Filed: Feb. 10, 2015

(86) PCT No.: PCT/JP2015/053708
§ 371 (c)(1),
(2) Date: Aug. 9, 2016

(87) PCT Pub. No.: WO2015/122416
PCT Pub. Date: Aug. 20, 2015

(65) Prior Publication Data
US 2016/0349475 A1 Dec. 1, 2016

(30) Foreign Application Priority Data
Feb. 12, 2014 (JP) ................. 2014-024806

(51) Int. Cl.
*G02B 7/02* (2006.01)
*G02B 13/00* (2006.01)
(Continued)

(52) U.S. Cl.
CPC ............. *G02B 7/022* (2013.01); *G02B 7/021* (2013.01); *G02B 9/34* (2013.01); *G02B 9/60* (2013.01);
(Continued)

(58) Field of Classification Search
None
See application file for complete search history.

(56) References Cited

U.S. PATENT DOCUMENTS 9,235,107 B2 * 1/2016 Han .................... G02B 7/02
2007/0139939 A1 * 6/2007 Li ....................... G02B 7/021
362/455

(Continued)

FOREIGN PATENT DOCUMENTS

JP     H0961689 A    3/1997
JP     2004087718 A    3/2004
(Continued)

OTHER PUBLICATIONS

International Search Report corresponding to Application No. PCT/JP2015/053708; dated May 12, 2015, with English translation.

*Primary Examiner* — W B Perkey
(74) *Attorney, Agent, or Firm* — Cantor Colburn LLP (57) ABSTRACT

A lens unit may include a plurality of lenses; and a lens barrel made of resin and comprising a tube part. A first press-fitted lens of the plurality of lenses may include a first press-fitted portion that is press-fitted to the tube part. An outer peripheral face of the tube part may include a thread groove. The tube part may include a circular groove which is recessed from an image side end face of the tube toward an object side, the circular groove being formed between an inner peripheral face and the outer peripheral face of the tube part. The first press-fitted portion may be provided on an image side end of the first press-fitted lens. An object side end of the circular groove may be disposed on an object side of the first press-fitted portion.

23 Claims, 4 Drawing Sheets

(51) Int. Cl.
*H04N 5/225* (2006.01)
*G02B 19/00* (2006.01)
*G02B 9/34* (2006.01)
*H04N 5/232* (2006.01)
*G02B 9/60* (2006.01)

(52) U.S. Cl.
CPC ..... *G02B 13/0045* (2013.01); *G02B 19/0014* (2013.01); *H04N 5/2254* (2013.01); *H04N 5/232* (2013.01)

(56) References Cited

U.S. PATENT DOCUMENTS

| | | | |
|---|---|---|---|
| 2009/0109554 A1* | 4/2009 | Christison | G02B 7/022 359/823 |
| 2013/0077183 A1* | 3/2013 | An | G02B 7/021 359/819 |
| 2016/0349475 A1* | 12/2016 | Horiuchi | G02B 7/021 |

FOREIGN PATENT DOCUMENTS

| | | | |
|---|---|---|---|
| JP | 2010199735 A | 9/2010 | |
| JP | 2011059396 A | 3/2011 | |
| JP | 2013213848 A | 10/2013 | |

\* cited by examiner

LENS UNIT AND IMAGING DEVICE

CROSS REFERENCE TO RELATED APPLICATIONS

This is the U.S. national stage of application No. PCT/JP2015/053708, filed on Feb. 10, 2015. Priority under 35 U.S.C. §119(a) and 35 U.S.C. §365(b) is claimed from Japanese Application No. 2014-024806, filed Feb. 12, 2014, the disclosure of which is incorporated herein by reference.

TECHNICAL FIELD

At least an embodiment of the present invention relates to a lens unit and an imaging device in which a lens is press-fitted to a lens barrel.

BACKGROUND

In a lens unit, a structure may be adopted in which at least one of a plurality of lenses is press-fitted and fixed to an inner side of a lens barrel. Further, when a lens unit is used in an imaging device, a structure may be adopted in which a female screw formed on an inner peripheral face of a holder is engaged with a thread groove which is formed on an outer peripheral face of a lens barrel so that the lens barrel and the holder are integrated with each other and thereby an imaging element is held through the holder (see Patent Literature 1).

PATENT LITERATURE

[PTL 1] Japanese Patent Laid-Open No. 2011-59396

However, in the structure described in Patent Literature 1, in a case that the lens barrel (lens holder) is made of resin, when the lens barrel is screwed into the holder (holder base), the lens barrel is deformed to an inner side and a lens press-fitted to the lens barrel is subjected to a stress and the lens may be deformed. Therefore, like the structure described in Patent Literature 1, a glass lens is required to be used for all the lenses and a plastic lens is unable to be used. Further, in the structure described in Patent Literature 1, in a case that the lens barrel (lens holder) is made of resin, when a lens is press-fitted into the lens barrel, the lens barrel is deformed to an outer side and the lens barrel may be hard to be smoothly screwed into the holder (holder base). Therefore, in the structure described in Patent Literature 1, in a case that fixing of the lens barrel is performed by a thread groove on an outer peripheral face of the lens barrel to which a lens is press-fitted and fixed, it is difficulty to use the lens barrel made of resin.

SUMMARY

In view of the problem described above, at least an embodiment of the present invention provides a lens unit and an imaging device in which, even in a case that a lens barrel is made of resin, the lens barrel is fixed through a thread groove formed on an outer peripheral face of the lens barrel to which a lens is press-fitted and fixed.

In order to attain the above, at least an embodiment of the present invention provides a lens unit including a plurality of lenses and a lens barrel made of resin having a tube part to which at least one of the plurality of the lenses is press-fitted. An outer peripheral face of the tube part is formed with a thread groove, and the tube part is formed with a circular groove which is recessed from an image side end face toward an object side between an inner peripheral face and the outer peripheral face of the tube part. When viewed in a direction perpendicular to an optical axis, a bottom part of the circular groove is located on the object side with respect to a press-fitted portion for the lens of the plurality of lenses which is press-fitted on the most image side to the inner peripheral face of the tube part.

In at least an embodiment of the present invention, a lens is press-fitted to the tube part of the lens barrel and, in addition, the lens barrel is fixed through the thread groove formed on the outer peripheral face of the tube part. Also in this case, the tube part of the lens barrel is formed with the circular groove which is recessed from the image side end face toward the object side between the inner peripheral face and the outer peripheral face of the tube part and, when viewed in the direction perpendicular to the optical axis, the bottom part of the circular groove is located on the object side with respect to a press-fitted portion for the lens on the most image side which is press-fitted to the inner peripheral face of the tube part. Therefore, even in a case that the lens barrel is made of resin, when the lens barrel is fixed through the thread groove formed on the outer peripheral face of the tube part, the tube part is hard to be deformed to an inner side. Especially, when the lens barrel is fixed through the thread groove formed on the outer peripheral face of the tube part, even in a lens which is easily affected by deformation to an inner side of the tube part (lens which is press-fitted to the inner peripheral face of the tube part on the most image side), a large stress is hard to be applied and deformation and eccentricity are hard to be occurred. Further, even in a case that the lens barrel is made of resin, when the lens is press-fitted into the lens barrel, the tube part is hard to be deformed to an outer side. Especially, when the lens barrel is fixed through the thread groove formed on the outer peripheral face of the tube part, the tube part is hard to be deformed to an outer side in the lens press-fitted portion on the most image side which may easily cause a problem and thus fixing of the lens barrel can be performed without a problem. Therefore, even in a case that the lens barrel is fixed through the thread groove formed on the outer peripheral face of the lens barrel to which the lens is press-fitted and fixed, the lens barrel is capable of being made of resin.

At least an embodiment of the present invention is effectively applied to a case that the lens of the plurality of lenses which is press-fitted on the most image side to the inner peripheral face of the tube part is a plastic lens. A plastic lens is easily deformed by a stress applied from the outside in comparison with a glass lens. However, according to at least an embodiment of the present invention, even when a plastic lens is used, a stress is hard to be applied when the lens barrel is fixed through the thread groove formed on the outer peripheral face of the tube part. Therefore, the plastic lens is hard to be deformed.

In at least an embodiment of the present invention, it is preferable that the lens unit includes a diaphragm which is located between two lenses adjacent to each other of the plurality of the lenses, the two lenses are press-fitted to the inner peripheral face of the tube part and, when viewed in the direction perpendicular to the optical axis, the bottom part of the circular groove is located on the object side with respect to the press-fitted portions for the two lenses. Influence of eccentricity on optical characteristics is remarkably large in the lenses disposed on both sides of the diaphragm. However, according to at least an embodiment of the present invention, a stress when the lens barrel is fixed through the thread groove formed on the outer peripheral face of the tube part is hard to be applied to the two lenses and thus eccentricity is hard to be occurred.

In at least an embodiment of the present invention, it is preferable that the plurality of the lenses includes a cemented lens formed of plastic lenses joined to each other, the cemented lens is press-fitted to the inner peripheral face of the tube part and, when viewed in the direction perpendicular to the optical axis, the bottom part of the circular groove is located on the object side with respect to a press-fitted portion for the cemented lens. The cemented lens formed by joining plastic lenses to each other may easily occur separation by a stress. However, according to at least an embodiment of the present invention, when the lens barrel is fixed through the thread groove formed on the outer peripheral face of the tube part, a stress is hard to be applied to the cemented lens and thus separation is hard to be occurred.

In at least an embodiment of the present invention, it is preferable that, when viewed in the direction perpendicular to the optical axis, the bottom part of the circular groove is located on the object side with respect to a region where the thread groove is formed. According to this structure, a stress is hard to be transmitted between the outer peripheral face and the inner peripheral faces of the tube part.

In at least an embodiment of the present invention, it is preferable that the circular groove is formed at a center between the inner peripheral face and the outer peripheral face of the tube part in the press-fitted portion for the lens of the tube part. According to this structure, in the press-fitted portion for the lens of the tube part, when the lens barrel is formed by resin molding, deterioration of dimensional accuracy and shape accuracy caused by shrinkage of resin is hard to be occurred. Further, also in the portion where the thread groove is formed on the outer peripheral face of the tube part, deterioration of dimensional accuracy and shape accuracy caused by shrinkage of resin is hard to be occurred.

In at least an embodiment of the present invention, it is preferable that a thickness in a radial direction of the tube part is varied according to a position in an optical axis direction, and that a groove width of the circular groove is varied in the optical axis direction so that a wall thickness in the radial direction of a portion of the tube part located on an inner side in the radial direction of the circular groove and a wall thickness in the radial direction of a portion of the tube part located on an outer side in the radial direction of the circular groove are equal at any position in the optical axis direction. For example, it is preferable that the thickness in the radial direction of the tube part is varied stepwise according to the position in the optical axis direction, and that the groove width of the circular groove is varied stepwise in the optical axis direction so that the wall thickness in the radial direction of the portion of the tube part located on the inner side in the radial direction of the circular groove and the wall thickness in the radial direction of the portion of the tube part located on the outer side in the radial direction of the circular groove are equal at any position in the optical axis direction. According to this structure, in the tube part, wall thicknesses of the portion located on an inner side in the radial direction of the circular groove and the portion located on an outer side in the radial direction of the circular groove can be equalized. Therefore, when the lens barrel is formed by resin molding, deterioration of dimensional accuracy and shape accuracy caused by shrinkage of resin is hard to be occurred.

Further, it is preferable that the groove width of the circular groove is varied in the optical axis direction so that the wall thickness in the radial direction of the portion of the tube part located on the inner side in the radial direction of the circular groove and the wall thickness in the radial direction of the portion of the tube part located on the outer side in the radial direction of the circular groove are equal to each other at any position in the optical axis direction. According to this structure, when the lens barrel is formed by resin molding, deterioration of dimensional accuracy and shape accuracy of the tube part caused by shrinkage of resin is hard to be occurred in the entire tube part.

In at least an embodiment of the present invention, it is preferable that the lens barrel includes a flange part which is enlarged at a midway position in an optical axis direction. According to this structure, when the lens barrel is fixed through the thread groove formed on the outer peripheral face of the tube part, the lens barrel can be positioned by the flange part.

In at least an embodiment of the present invention, it is preferable that the tube part includes a caulking part configured to press an object side lens of the plurality of the lenses which is located on the most object side to a side of the lens which is press-fitted to the inner peripheral face of the tube part on an image side in an optical axis direction with respect to the object side lens. According to this structure, positions of the plurality of the lenses can be fixed in the optical axis direction. Further, the optical axis can be adjusted by the most object side lens and thus positional adjustment is easily performed in comparison with a case that positional adjustment is performed by a lens having a high sensitivity on the mage side in the optical axis direction.

The lens unit in accordance with at least an embodiment of the present invention may be used in an imaging device and, in this case, the imaging device includes a holder whose inner peripheral face is formed with a female screw engaged with the thread groove, and an imaging element which is held on the image side with respect to the lens unit through the holder. Further, in this case, it is desirable that the imaging device includes an elastic sealing member which is disposed in the circular groove, and the elastic sealing member seals a space between a circuit board on which the imaging element is mounted and the circular groove. The circular groove may be utilized as a receiving part which receives the elastic sealing member.

Further, at least an embodiment of the present invention provides a lens unit including a plurality of lenses and a lens barrel made of resin having a tube part to which at least one of the plurality of the lenses is press-fitted. The tube part is fixed to another member by press-fitting, and the tube part is formed with a circular groove which is recessed from an image side end face toward an object side between an inner peripheral face and an outer peripheral face of the tube part. When viewed in a direction perpendicular to an optical axis, a bottom part of the circular groove is located on the object side with respect to a press-fitted portion for the lens of the plurality of lenses which is press-fitted on the most image side to the inner peripheral face of the tube part.

The lens unit in accordance with at least an embodiment of the present invention may be used in an imaging device and, in this case, the imaging device includes a holder to which the tube part is press-fitted, and an imaging element which is held on an image side with respect to the lens unit through the holder.

In at least an embodiment of the present invention, even in a case that the lens barrel is made of resin, when the lens barrel is fixed through the thread groove formed on the outer peripheral face of the tube part, the tube part is hard to be deformed to an inner side. Especially, when the lens barrel is fixed through the thread groove formed on the outer peripheral face of the tube part, even in a lens which is easily affected by deformation to an inner side of the tube part (lens which is press-fitted to the inner peripheral face of the tube part on the most image side), a large stress is hard to be applied and deformation and eccentricity are hard to be occurred. Further, even in a case that the lens barrel is made of resin, when the lens is press-fitted into the lens barrel, the tube part is hard to be deformed to an outer side. Especially, when the lens barrel is fixed through the thread groove formed on the outer peripheral face of the tube part, the tube part is hard to be deformed to an outer side in the lens press-fitted portion on the most image side which easily causes a problem and thus fixing of the lens barrel can be performed without a problem. Therefore, even in a case that the lens barrel is fixed through the thread groove formed on the outer peripheral face of the lens barrel to which the lens is press-fitted and fixed, the lens barrel can be made of resin.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF EMBODIMENTS

Embodiments of the present invention will be described below with reference to the accompanying drawings.
[Structure of Lens Unit]

Figure 1A:
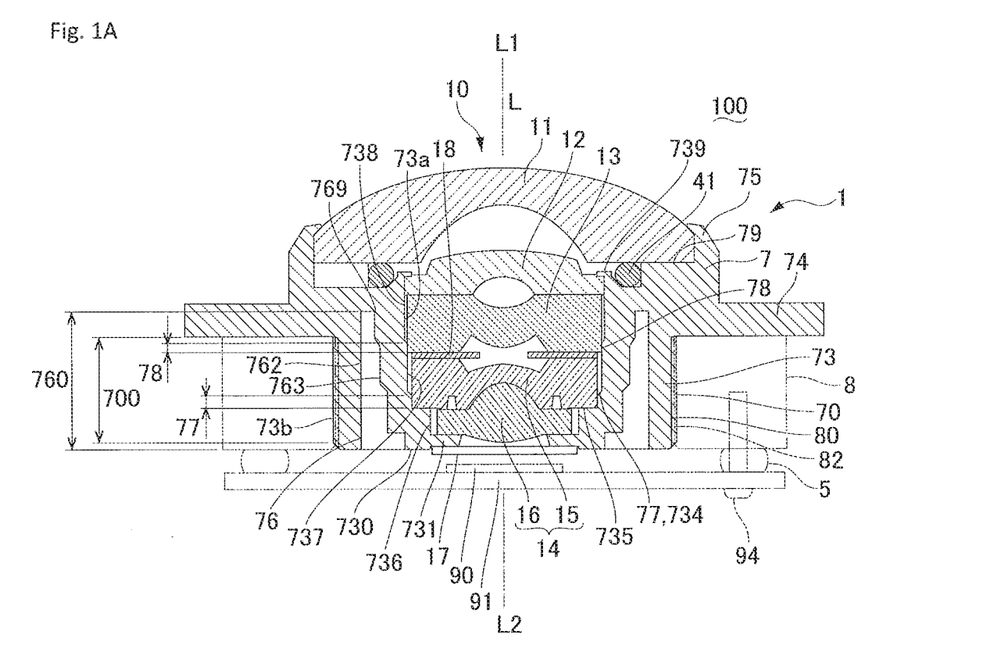
FIGS. 1A and 1B are explanatory views showing a lens unit to which at least an embodiment of the present invention is applied.
Figure 1B:
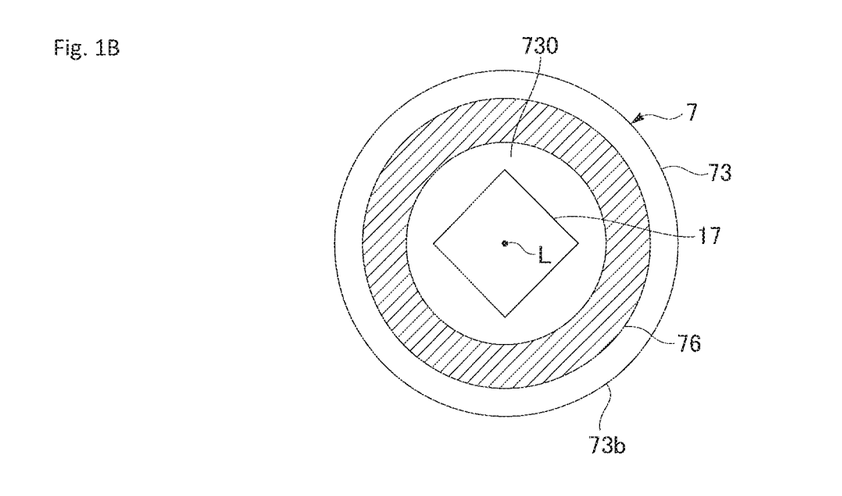

FIGS. 1A and 1B are explanatory views showing a lens unit 1 to which at least an embodiment of the present invention is applied. FIG. 1A is a cross-sectional view showing a lens unit 1 and FIG. 1B is an explanatory view showing a first tube part 73 of a lens barrel 7 used in a lens unit 1 which is viewed from an image side "L2".

As shown in FIG. 1A, a lens unit 1 in this embodiment includes a wide-angle lens 10 comprised of a plurality of lenses disposed in an optical axis "L" direction and a tube-shaped lens barrel 7 which holds the wide-angle lens 10 on its inner side. The lens unit 1 is used in an imaging device 100 described below and the like.

A viewing angle of the wide-angle lens 10 is, for example, 190°. The wide-angle lens 10 includes, for example, four lens groups. More specifically, the wide-angle lens 10 includes, in order from an object side (object to be photographed side/front side), a first lens group comprised of a first lens 11 having negative power, a second lens group comprised of a second lens 12 having negative power, a third lens group comprised of a third lens 13 having positive power, and fourth lens group comprised of a cemented lens 14 having positive power. The first lens is formed of a glass lens or a plastic lens, and the second lens 12 and the third lens 13 are formed of a plastic lens. The cemented lens 14 is a cemented lens comprised of a fourth lens 15 formed of a plastic lens having negative power and a fifth lens 16 formed of a plastic lens having positive power. The lens unit 1 includes a diaphragm 18 between the third lens 13 and the fourth lens 15. Further, the lens unit 1 includes an infrared cut filter 17 to an image side "L2" of the cemented lens 14.
(Structure and the like of Lens Barrel 7)

An outer diameter dimension of the first lens 11 is larger than those of the second lens 12, the third lens 13 and the cemented lens 14. Outer diameter dimensions of the second lens 12 and the third lens 13 are substantially equal to each other, or an outside dimension of the second lens 12 is slightly larger than that of the third lens 13, and the outer diameter dimensions of the second lens 12 and the third lens 13 are slightly larger than that of the fourth lens 15. In the cemented lens 14, an outside dimension of the fourth lens 15 is larger than that of the fifth lens 16.

A lens barrel 7 is provided with a first tube part 73 (tube part in at least an embodiment of the present invention) located on an image side "L2" and a second tube part 75 in a tube shape located on an object side "L1" with respect to the first tube part 73 so as to correspond to the above-mentioned shapes. An inner diameter dimension of the second tube part 75 is larger than an outer diameter dimension of the first tube part 73. Further, the lens barrel 7 is formed with a flange part 74 enlarged from the first tube part 73 and the second tube part 75 at a midway position in an optical axis "L" direction (at an end part on the object side "L1" of the first tube part 73). A step part facing the image side "L2" is formed by the flange part 74.

A circular ring-shaped part 731 which is projected to an inner side in a radial direction is formed on the most image side "L2" of the first tube part 73. The infrared cut filter 17 is fixed to the circular ring-shaped part 731.

The first tube part 73 is provided, from the image side "L2" toward the object side "L1", a first portion 736, a second portion 737 and a third portion 738 whose inner diameter dimensions are different from each other. The inner diameters of the respective portions are set to be the following relationship;

first portion 736<second portion 737<third portion 738
Therefore, a step part 735 in a circular ring shape which faces the object side "L1" is formed between the first portion 736 and the second portion 737. Further, a portion of the second portion 737 adjacent to the step part 735 on the object side "L1" is formed with a press-fitting small diameter part 734 which is slightly projected to an inner side in a radial direction.
(Fixing Structure of Lenses)

Fixing structure of the lenses to the lens barrel 7 will be described below while describing a manufacturing method for the lens unit 1.

First, the cemented lens 14 which is constituted of the fourth lens 15 and the fifth lens 16 joined to each other is mounted on an inner side of the lens barrel 7 from the object side "L1". In this case, an outer diameter of the fifth lens 16 is smaller than an inner diameter of the first portion 736 and thus a space is formed between an outer peripheral end part of the fifth lens 16 and the inner peripheral face of the first portion 736.

On the other hand, an outer diameter of the fourth lens 15 is larger than an inner diameter of the first portion 736. Therefore, the fourth lens 15 is disposed to an inner side of the second portion 737. In this embodiment, the outer diameter of the fourth lens 15 is smaller than an inner diameter of the second portion 737 but is slightly larger than an inner diameter of the press-fitting small diameter part 734. Therefore, the fourth lens 15 is press-fitted to the press-fitting small diameter part 734 and the fourth lens 15 (cemented lens 14) is fixed in the radial direction by a press-fitted portion 77. Further, an outer peripheral end part of the fourth lens 15 is supported by the step part 735 and the fourth lens 15 (cemented lens 14) is positioned in the optical axis "L" direction.

Next, a diaphragm 18 is disposed to an inner side of the first tube part 73 and then the third lens 13 is disposed to an inner side of the first tube part 73. The third lens 13 is disposed to an inner side of the third portion 738, but a part on the image side "L2" of the third lens 13 is entered to an inner side of the second portion 737. In this embodiment, an outer diameter of the third lens 13 is slightly larger than the inner diameter of the second portion 737. Therefore, the third lens 13 is press-fitted to the second portion 737 and the third lens 13 is fixed in the radial direction by a press-fitted portion 78. Further, the third lens 13 is supported by the fourth lens 15 through the diaphragm 18 from the image side "L2" and is positioned in the optical axis "L" direction.

Next, the second lens 12 (object side lens) is disposed to an inner side of the first tube part 73. As a result, the second lens 12 is disposed to an inner side of the third portion 738. In this embodiment, an outer diameter of the second lens 12 is slightly smaller than an inner diameter of the third portion 738. Therefore, the second lens 12 is not press-fitted to the third portion 738. Next, a position of the second lens 12 in an "X" direction and a "Y" direction is adjusted. After that, an outer peripheral end part of the second lens 12 is covered with a caulking part 739 which is formed so that a protruded part protruded to the object side "L1" from an inner peripheral edge of the first tube part 73 is heated and deformed to an inner side, and the second lens 12 is fixed and pressed against the third lens 13 by the caulking part 739. The positions of the second lens 12, the third lens 13, the diaphragm 18 and the cemented lens 14 are surely fixed in the optical axis "L" direction by the pressing. In a case that the optical axis "L" is adjusted by moving the lens groups (third lens 13 and cemented lens 14) on the image side with respect to the second lens 12 in the optical axis "L" direction, a high degree of positional adjustment is required due to high sensitivity. However, in a case that adjustment is performed by using the second lens 12, the sensitivity is not excessively high and thus adjustment can be performed relatively easily.

Next, the first lens 11 is disposed to an inner side of the second tube part 75 interposing an O-ring 41 made of rubber at an end part on the object side "L1" of the first tube part 73, and the first lens 11 is pressed to the image side "L2" and fixed by a caulking part which is formed so that a tip end of the second tube part 75 is heated and deformed. In this embodiment, an end part on the object side "L1" of the first tube part 73 of the lens barrel 7 is formed with receiving parts 79, which receive the first lens 11 on the image side "L2", at a plurality of positions in a circumferential direction. Therefore, the first lens 11 is fixed between the receiving parts 79 and the caulking part of the tip end of the second tube part 75. In accordance with an embodiment of the present invention, the receiving part 79 may be formed in a ring shape connected over the entire periphery.

(Structure of Thread Groove 70)

In the lens unit 1 in this embodiment, a thread groove 70 is formed on an outer peripheral face 73b of the first tube part 73 of the lens barrel 7. In this embodiment, the thread groove 70 is formed on the outer peripheral face 73b of the first tube part 73 over the entire region in the optical axis "L" direction (region 700).

(Structure of Circular Groove 76)

In the lens unit 1 in this embodiment, the first tube part 73 of the lens barrel 7 is formed with a circular groove 76, which is recessed from an image side end face 730 toward the object side, between the inner peripheral face 73a of the first tube part 73 and its outer peripheral face 73b.

In this embodiment, the circular groove 76 is, when viewed in a direction perpendicular to the optical axis "L", provided with a depth 760 so that a bottom part 769 of the circular groove 76 is located on the object side "L1" with respect to the region 700 where the thread groove 70 is formed.

As a result, when viewed in the direction perpendicular to the optical axis "L", the bottom part 769 of the circular groove 76 is located on the object side "L1" with respect to the press-fitted portion 77 for the fourth lens 15 of the plurality of the lenses which is press-fitted on the most image side to the inner peripheral face 73a of the first tube part 73. Further, when viewed in the direction perpendicular to the optical axis "L", the bottom part 769 of the circular groove 76 is located on the object side "L1" with respect to the press-fitted portion 77 for the cemented lens 14 of the plurality of the lenses which is press-fitted to the inner peripheral face of the first tube part 73.

Further, when viewed in the direction perpendicular to the optical axis "L", the bottom part 769 of the circular groove 76 is located on the object side "L1" with respect to both the press-fitted portions 77 and 78 for the two lenses (third lens 13 and fourth lens 15) of the plurality of the lenses, which are located on both sides in the optical axis "L" direction of the diaphragm 18.

In this embodiment, a thickness in the radial direction of the first tube part 73 is varied according to a position in the optical axis "L" direction. Corresponding to this structure, a groove width of the circular groove 76 is varied in the optical axis "L" direction so that a wall thickness in the radial direction of a portion of the first tube part 73 located on an inner side in the radial direction of the circular groove 76 (wall thickness between the inner peripheral face 73a of the first tube part 73 and the circular groove 76) and a wall thickness in the radial direction of a portion of the first tube part 73 located on an outer side in the radial direction of the circular groove 76 (wall thickness between the outer peripheral face 73b of the first tube part 73 and the circular groove 76) are equal at any position in the optical axis "L" direction.

More specifically, an outer diameter of a portion of the first tube part 73 located to the image side "L2" of the flange part 74 is constant in the optical axis "L" direction but its inner diameter is varied in the optical axis "L" direction. In this embodiment, an inner diameter of a portion of the first tube part 73 located to the image side "L2" of the flange part 74 is enlarged stepwise from the image side "L2" toward the object side "L1" in the optical axis "L" direction so as to correspond to the outer diameters of the respective lenses. Corresponding to this shape, a diameter of a wall face 762 of the circular groove 76 located on an outer side in the radial direction is constant in the optical axis "L" direction and, on the other hand, a diameter of its wall face 763 located on an inner side in the radial direction is enlarged stepwise in the optical axis "L" direction. Therefore, a groove width of the circular groove 76 is varied stepwise in the optical axis "L" direction so that a wall thickness in the radial direction of a portion of the first tube part 73 located on an inner side in the radial direction of the circular groove 76 and a wall thickness in the radial direction of a portion of the first tube part 73 located on an outer side in the radial direction of the circular groove 76 are respectively equal at any position in the optical axis "L" direction.

The circular groove 76 is formed at a substantially center between the inner peripheral face 73a and the outer peripheral face 73b of the first tube part 73. Therefore, the circular groove 76 divides the wall thickness of the first tube part 73 into two substantially equal widths. Therefore, the wall thickness in the radial direction of the portion of the first tube part 73 located on an inner side in the radial direction of the circular groove 76 (wall thickness between the inner peripheral face 73a of the first tube part 73 and the circular groove 76) and a wall thickness in the radial direction of a portion of the first tube part 73 located on an outer side in the radial direction of the circular groove 76 (wall thickness between the outer peripheral face 73b of the first tube part 73 and the circular groove 76) are set to be equal at any position in the optical axis "L" direction. Especially, in the press-fitted portions 77 and 78 of the first tube part 73, the circular groove 76 is formed at a center between the inner peripheral face 73a and the outer peripheral face 73b of the first tube part 73. Therefore, in the press-fitted portions 77 and 78 of the first tube part 73, the circular groove 76 divides the wall thickness of the first tube part 73 into two equal widths and thus the wall thickness between the inner peripheral face 73a of the first tube part 73 and the circular groove 76 and the wall thickness between the outer peripheral face 73b of the first tube part 73 and the circular groove 76 are equal to each other.

(Structure of Imaging Device 100)

When the lens unit 1 in this embodiment is to be used in an imaging device 100, a female screw 80 formed on an inner peripheral face 82 of a holder 8 is engaged with the thread groove 70 of the lens barrel 7. In this state, the holder 8 is abutted with the flange part 74 and is positioned in the optical axis "L" direction. An imaging element 90 is held to an image side "L2" of the lens unit 1 through the holder 8.

More specifically, a circuit board 91 is fixed to the holder 8 by a screw 94 in a state that an elastic sealing member 5 is disposed between the circuit board 91 on which an imaging element 90 is mounted and the holder 8. In this case, it may be structured that the elastic sealing member 5 is elastically deformed by adjusting a fastening amount of the screw 94 and thereby a position in the optical axis "L" direction of the imaging element 90 is adjusted. In this embodiment, the elastic sealing member 5 is provided for sealing between the circuit board 91 and the holder 8 and thus foreign matter such as moisture is hard to be entered from the outside.

Instead of sealing between the circuit board 91 and the holder 8 by the elastic sealing member 5, the elastic sealing member 5 may seal between the circular groove 76 and the circuit board 91. Further, both of the two positions may be sealed by the elastic sealing member 5. In a case of sealing between the circular groove 76 and the circuit board 91, an elastic sealing member having no adhesiveness which has been solidified after liquid composition is applied to the circular groove 76 may be formed. In this case, when an elastic sealing member made of liquid composition is to be disposed in the circular groove 76, the liquid composition is applied to the circular groove without leaving a space so that air is prevented from entering. Further, an O-ring as an elastic sealing member may be disposed for sealing between the circular groove 76 and the circuit board 91.

Figure 2:
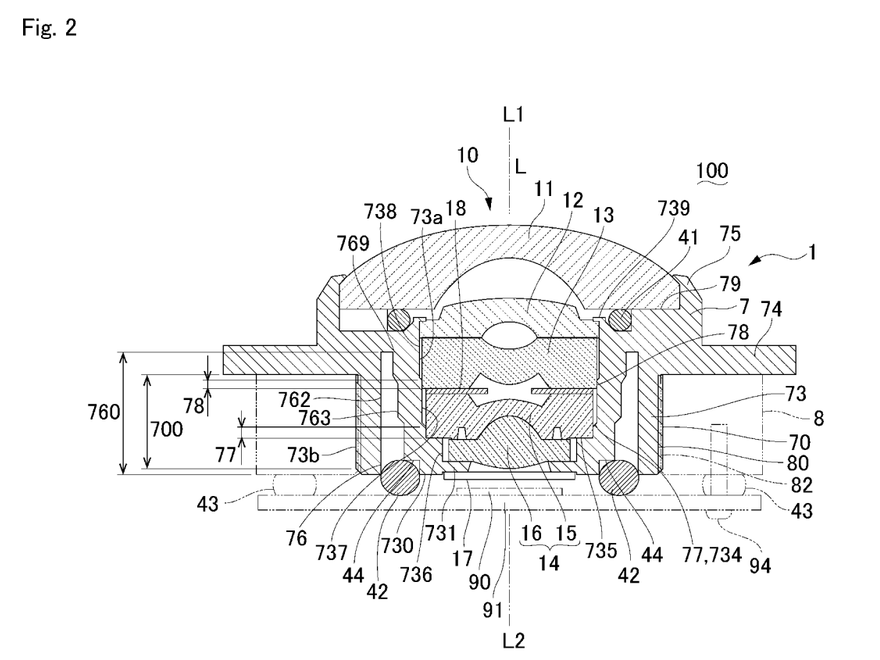
FIG. 2 is an explanatory view showing another example of a sealing structure between a lens unit and a circuit board.

FIG. 2 is a cross-sectional view showing another example of a sealing structure between the lens unit 1 and the circuit board 91. In the example shown in FIG. 2, an O-ring 43 is disposed between the circuit board 91 and the holder 8 and, in addition, an O-ring 42 is disposed between the circuit board 91 and the circular groove 76. The O-ring 42 disposed in the circular groove 76 is supported from the object side "L1" by an O-ring receiving part 44 formed in the circular groove 76. For example, in this embodiment, the wall face 763 of the circular groove 76 is provided with a step face directing to the image side "L2", and the step face structures the O-ring receiving part 44.

In accordance with an embodiment of the present invention, it may be structured that the elastic sealing member 5 is disposed between the circuit board 91 and the holder 8 and the O-ring 42 is disposed between the circuit board 91 and the circular groove 76.

Moisture and the like can be restrained from entering to surroundings of the imaging element 90 from the outside by the sealing structure. Further, at the time of fixing by engaging the thread groove 70 with the female screw 80, dust and dirt occurred due to friction and the like can be restrained from attaching to the imaging element 90.

(Principal Effects in this Embodiment)

As described above, in this embodiment, the third lens 13 and the fourth lens 15 are press-fitted to the first tube part 73 of the lens barrel 7 and, in addition, the lens barrel 7 is fixed through the thread groove 70 formed on the outer peripheral face 73b of the first tube part 73. Also in this case, the first tube part 73 of the lens barrel 7 is formed with the circular groove 76 which is recessed from the image side end face 730 toward the object side "L1" between the inner peripheral face 73a and the outer peripheral face 73b of the first tube part 73 and, when viewed in the direction perpendicular to the optical axis "L", the bottom part 769 of the circular groove 76 is located on the object side "L1" with respect to the press-fitted portion 77 of the fourth lens 15 which is press-fitted on the most image side "L2" to the inner peripheral face 73a of the first tube part 73.

Therefore, even in a case that the lens barrel 7 is made of resin, when the lens barrel 7 and the holder 8 are fixed to each other through the thread groove 70 formed on the outer peripheral face 73b of the first tube part 73, the first tube part 73 is hard to be deformed to an inner side. Especially, when the lens barrel 7 and the holder 8 are to be fixed to each other, the end part of the first tube part 73 on the most image side "L2" is entered into the inner peripheral face 82 of the holder 8 and thus a large stress is easily applied to the fourth lens 15 which is press-fitted on the most image side "L2" to the inner peripheral face 73a of the first tube part 73. However, in this embodiment, the fourth lens 15 is hard to receive a large stress and thus deformation and eccentricity are hard to be occurred. Further, even in a case that the lens barrel 7 is made of resin, when the fourth lens 15 is press-fitted into the lens barrel 7, the first tube part 73 is hard to be deformed to an outer side. Especially, in this embodiment, when the lens barrel 7 and the holder 8 are to be fixed to each other, the end part of the first tube part 73 on the most image side "L2" is entered into the inner peripheral face 82 of the holder 8 and thus a problem may easily occur in the end part. However, according to this embodiment, even when the fourth lens 15 is press-fitted to the lens barrel 7, the first tube part 73 is hard to be deformed to an outer side. Therefore, even in a case that the lens barrel 7 and the holder 8 are fixed to each other through the thread groove 70 formed on the outer peripheral face of the lens barrel 7 to which the fourth lens 15 is press-fitted and fixed, the lens barrel 7 can be made of resin.

In this embodiment, the fourth lens 15 is a plastic lens but is hard to receive a large stress and thus the fourth lens 15 is hard to be deformed. Further, even in a case that the lens barrel 7 is made of resin, when the fourth lens 15 is press-fitted to the lens barrel 7, the first tube part 73 is hard to be deformed to an outer side.

In this embodiment, when viewed in the direction perpendicular to the optical axis "L", the bottom part 769 of the circular groove 76 is located on the object side "L1" with respect to the press-fitted portion 77 for the fourth lens 15 and thus the bottom part 769 is located on the object side "L1" with respect to the press-fitted portion 77 for the cemented lens 14 which is press-fitted to the inner peripheral face of the first tube part 73. Therefore, a stress when the lens barrel 7 and the holder 8 are fixed is hard to be applied to the cemented lens 14 and thus separation is hard to be occurred in the cemented lens 14. Especially, in this embodiment, the cemented lens 14 is formed by joining plastic lenses to each other and thus separation caused by deformation is easily occurred. However, according to this embodiment, even when the cemented lens 14 formed of joined plastic lenses is used, separation is hard to be occurred.

In this embodiment, when viewed in the direction perpendicular to the optical axis "L", the bottom part 769 of the circular groove 76 is located on the object side "L1" with respect to both of the press-fitted portions 77 and 78 for two lenses (third lens 13 and fourth lens 15) of a plurality of the lenses which are located on both sides of the diaphragm 18 in the optical axis "L" direction. Influence of eccentricity on optical characteristics is remarkably large in the two lenses (third lens 13 and fourth lens 15). However, according to this embodiment, a stress when the lens barrel 7 and the holder 8 are fixed to each other is hard to be applied to the two lenses and thus eccentricity is hard to be occurred. Therefore, deterioration of optical characteristics caused by eccentricity can be restrained.

In the first tube part 73, the thickness in the radial direction of the portion located on the image side "L2" with respect to the flange part 74 is varied according to the position in the optical axis "L" direction. However, the groove width of the circular groove 76 is varied in the optical axis "L" direction so that the wall thickness in the radial direction of a portion of the first tube part 73 located on an inner side in the radial direction of the circular groove 76 (wall thickness between the inner peripheral face 73a of the first tube part 73 and the circular groove 769 and the wall thickness in the radial direction of a portion of the first tube part 73 located on an outer side in the radial direction of the circular groove 76 (wall thickness between the outer peripheral face 73b of the first tube part 73 and the circular groove 76) are equal at any position in the optical axis "L" direction. Therefore, even in a case that the wall thickness of the first tube part 73 is thick on the image side "L2" and thin on the object side "L1", in both of the portion of the first tube part 73 located on an inner side in the radial direction of the circular groove 76 and the portion of the first tube part 73 located on an outer side in the radial direction of the circular groove 76, when the lens barrel 7 is formed by resin molding, deterioration of dimensional accuracy and shape accuracy caused by shrinkage of resin is hard to be occurred.

The circular groove 76 is formed at the substantially center between the inner peripheral face 73a and the outer peripheral face 73b of the first tube part 73. The wall thickness in the radial direction of the portion of the first tube part 73 located on an inner side in the radial direction of the circular groove 76 (wall thickness between the inner peripheral face 73a of the first tube part 73 and the circular groove 76) and the wall thickness in the radial direction of the portion of the first tube part 73 located on an outer side in the radial direction of the circular groove 76 (wall thickness between the outer peripheral face 73b of the first tube part 73 and the circular groove 76) are set to be equal to each other at any position in the optical axis "L" direction. Therefore, even in a case that the wall thickness of the first tube part 73 is thick on the image side "L2" and thin on the object side "L1", the wall thickness of the portion of the first tube part 73 located on an inner side in the radial direction of the circular groove 76 and the wall thickness of the portion of the first tube part 73 located on an outer side in the radial direction of the circular groove 76 are equal to each other. Therefore, when the lens barrel 7 is formed by resin molding over the entire first tube part 73, deterioration of dimensional accuracy and shape accuracy caused by shrinkage of resin is hard to be occurred.

Especially, in the press-fitted portions 77 and 78 of the first tube part 73, the circular groove 76 divides the wall thickness of the first tube part 73 into two equal widths and thus the wall thickness between the inner peripheral face 73a of the first tube part 73 and the circular groove 76 and the wall thickness between the outer peripheral face 73b of the first tube part 73 and the circular groove 76 are equal to each other. Therefore, even in the portion where the thread groove 70 is formed on the outer peripheral face 73b of the first tube part 73 and, even in the portions where the press-fitted portions 77 and 78 are formed on the inner peripheral face 73a of the first tube part 73, when the lens barrel 7 is formed by resin molding, deterioration of dimensional accuracy and shape accuracy caused by shrinkage of resin is hard to be occurred.

[First Modified Embodiment of Lens Unit]

Figure 3A:
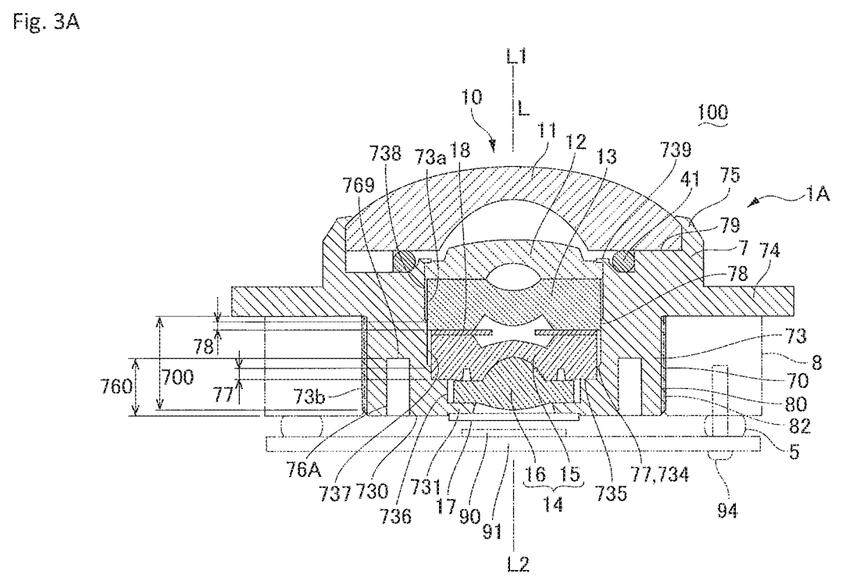
FIGS. 3A and 3B are cross-sectional views showing a first modified embodiment of a lens unit to which at least an embodiment of the present invention is applied.
Figure 3B:
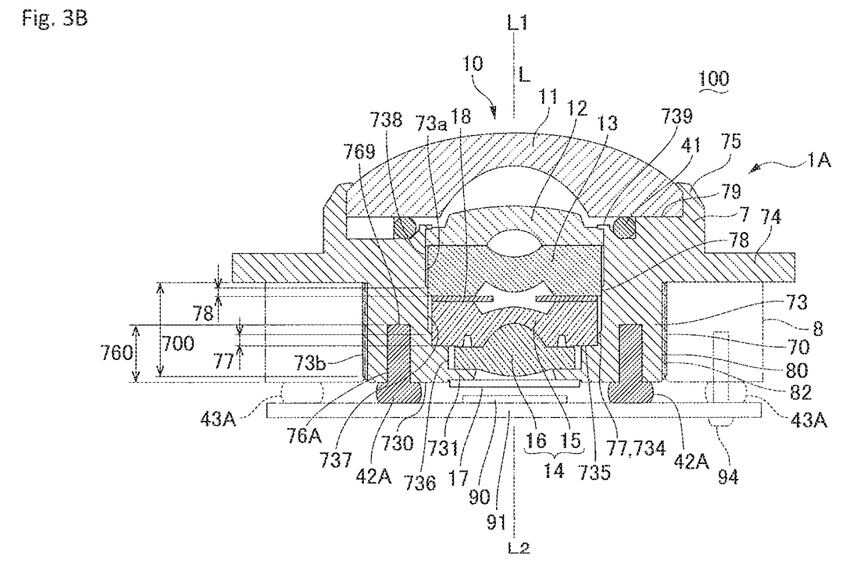

FIGS. 3A and 3B are cross-sectional views showing a first modified embodiment of a lens unit to which at least an embodiment of the present invention is applied. Basic structure in the first modified embodiment is similar to the embodiment shown in FIGS. 1A and 1B and thus the same reference signs are used in common portions and their descriptions are omitted.

In the embodiment shown in FIG. 1A, when viewed in the direction perpendicular to the optical axis "L", the bottom part 769 of the circular groove 76 is located on the object side "L1" with respect to the region 700 where the thread groove 70 is formed and, in addition, is located on the object side "L1" with respect to both of the press-fitted portion 77 for the fourth lens 15 and the press-fitted portion 78 for the third lens. On the other hand, in lens units 1A in the first modified embodiment, as shown in FIGS. 3A and 3B, when viewed in a direction perpendicular to the optical axis "L", a bottom part 769 of the circular groove 76A is located on an object side "L1" with respect to the press-fitted portion 77 for the fourth lens 15 but is located on an image side "L2" with respect to the press-fitted portion 78 for the third lens 13.

Also in this structure, when viewed in the direction perpendicular to the optical axis "L", the bottom part 769 of the circular groove 76A is located on the object side "L1" with respect to the press-fitted portion 77 for the fourth lens 15 which is press-fitted on the most image side "L2" to an inner peripheral face 73a of the first tube part 73. Therefore, although the fourth lens 15 easily receives influence of deformation of the first tube part 73 when the lens barrel 7 and the holder 8 are fixed to each other, the fourth lens 15 is hard to receive a large stress. Further, when the fourth lens 15 is to be press-fitted, an end part on the image side "L2" of the first tube part 73 is hard to be deformed to an outer side.

Various sealing structures may be, similarly to the embodiment shown in FIG. 1A, applied to a sealing structure between the lens unit 1A in the first modified embodiment and the circuit board 91. For example, as shown in FIG. 3A, an elastic sealing member 5 may be disposed at one position between the circuit board 91 and the holder 8. Further, as shown in FIG. 3B, an elastic sealing member 43A is disposed between the circuit board 91 and the holder 8 and an elastic sealing member 42A is disposed between the circuit board 91 and the circular groove 76A to provide double sealing. Alternatively, it may be structured that only elastic sealing member 42A is used as a sealing member. For example, in FIG. 3B, an elastic sealing member 42A having no adhesiveness which has been solidified after liquid composition is applied to an inside of the circular groove without leaving a space is used. Further, one or both of the elastic sealing members 42A and 43A may be an O-ring.

[Second Modified Embodiment of Lens Unit]

Figure 4:
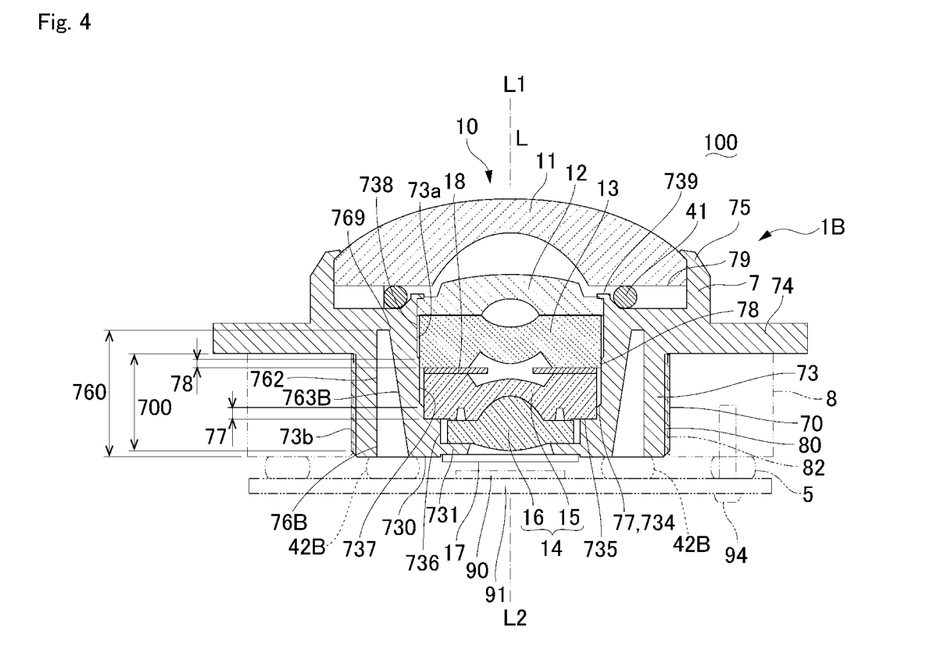
FIG. 4 is a cross-sectional view showing a second modified embodiment of a lens unit to which at least an embodiment of the present invention is applied.

FIG. 4 is a cross-sectional view showing a second modified embodiment of a lens unit to which at least an embodiment of the present invention is applied. Basic structure in the second modified embodiment is similar to the embodiment shown in FIGS. 1A and 1B and thus the same reference signs are used in common portions and their descriptions are omitted.

In the embodiment shown in FIG. 1A, the circular groove 76 is formed so that its inner diameter is enlarged stepwise in the optical axis "L" direction from the image side "L2" toward the object side "L1". On the other hand, in the lens unit 1B in the second modified embodiment, as shown in FIG. 4, a wall face 763B located on an inner side in the radial direction of the circular groove 76B is formed as a tapered face which is inclined with respect to the optical axis "L" direction. Therefore, an inner diameter of the circular groove 76B is continuously enlarged (tapered shape) in the optical axis "L" direction from the image side "L2" toward the object side "L1". Also in this structure, operations and effects similar to the above-mentioned embodiments can be realized.

A sealing structure between the lens unit 1B in the second modified embodiment and the circuit board 91 may be structured similarly to the above-mentioned embodiments. For example, the elastic sealing member 5 disposed between the circuit board 91 and the holder 8 may be used. Further, as shown by the broken line in FIG. 4, the elastic sealing member 42B may be added between the circuit board 91 and the circular groove 76B to provide double sealing. Alternatively, it may be structured that only elastic sealing member 42B is used as a sealing member. An inner diameter of the circular groove 76B is continuously enlarged (tapered shape) in the optical axis "L" direction from the image side "L2" toward the object side "L1" and thus, when liquid composition is applied to an inside of the circular groove 76B, air is hard to be left in the inside of the circular groove 76B. Accordingly, a space is hard to be left between the inner face of the circular groove 76B and the elastic sealing member 42B and thus sealing is surely performed.

Other Embodiments (1) In the respective above-mentioned embodiments, a groove for mounting an O-ring made of rubber may be formed over the entire periphery on the outer peripheral face 73b of the first tube part 73. At least an embodiment of the present invention may be applied to the lens barrel 7 having this structure.

(2) In the respective above-mentioned embodiments, the thread groove 70 is formed on the outer peripheral face 73b of the first tube part 73 of the lens barrel 7 and, when the lens units 1, 1A and 1B are to be used in the imaging device 100, the female screw 80 formed on the inner peripheral face 82 of the holder 8 is engaged with the thread groove 70 of the lens barrel 7. However, when the lens units 1, 1A and 1B are to be used in the imaging device 100, it may be structured that the first tube part 73 is press-fitted and fixed to an attaching member (another member) such as a tube-shaped holder 8. In this case, the outer peripheral face 73b of the first tube part 73 is formed to be a fixing face having no thread groove and the inner peripheral face 82 of the holder 8 is formed to be a fixing face having no female screw 80. The fixing face of the first tube part 73 is fixed to the fixing face of the holder 8 by press fitting.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A lens unit comprising:
   a plurality of lenses; and
   a lens barrel made of resin and comprising a tube part;
   wherein a first press-fitted lens of the plurality of lenses comprises a first press-fitted portion that is press-fitted to the tube part;
   wherein an outer peripheral face of the tube part comprises a thread groove;
   wherein the tube part comprises a circular groove which is recessed from an image side end face of the tube toward an object side, the circular groove being formed between an inner peripheral face and the outer peripheral face of the tube part;
   the first press-fitted portion is provided on an image side end of the first press-fitted lens; and
   wherein an object side end of the circular groove is disposed on an object side of the first press-fitted portion.

2. The lens unit according to claim 1, wherein the first press-fitted lens is a plastic lens.

3. The lens unit according to claim 1, further comprising a diaphragm provided between the first press-fitted lens and a second press-fitted lens of the plurality of the lenses, the second press-fitted lens comprising a second press-fitted portion that is press-fitted to the tube part;
   wherein the object side end of the circular groove is disposed on an object side of the second press-fitted portion.

4. The lens unit according to claim 1, wherein
   the plurality of the lenses comprises a cemented lens comprising plastic lenses joined to each other,
   the cemented lens comprises a cemented lens press-fitted portion that is press-fitted to the inner peripheral face of the tube part, and
   wherein the object side end of the circular groove is disposed on an object side of the cemented lens press-fitted portion.

5. The lens unit according to claim 1, wherein the object side end of the circular groove is disposed on an object side of a region where the thread groove is formed.

6. The lens unit according to claim 1, wherein the circular groove is formed at a center between the inner peripheral face and the outer peripheral face of the tube part at the first press-fitted portion.

7. The lens unit according to claim 1, wherein
a thickness in a radial direction of the tube part is varied according to a position in an optical axis direction, and
a groove width of the circular groove is varied in the optical axis direction so that a wall thickness in the radial direction of a portion of the tube part located on an inner side in the radial direction of the circular groove and a wall thickness in the radial direction of a portion of the tube part located on an outer side in the radial direction of the circular groove are equal at any position in the optical axis direction.

8. The lens unit according to claim 7, wherein
the thickness in the radial direction of the tube part is varied stepwise according to the position in the optical axis direction, and
the groove width of the circular groove is varied stepwise in the optical axis direction so that the wall thickness in the radial direction of the portion of the tube part located on the inner side in the radial direction of the circular groove and the wall thickness in the radial direction of the portion of the tube part located on the outer side in the radial direction of the circular groove are equal at any position in the optical axis direction.

9. The lens unit according to claim 7, wherein the groove width of the circular groove is varied in the optical axis direction so that the wall thickness in the radial direction of the portion of the tube part located on the inner side in the radial direction of the circular groove and the wall thickness in the radial direction of the portion of the tube part located on the outer side in the radial direction of the circular groove are equal to each other at any position in the optical axis direction.

10. The lens unit according to claim 1, wherein the lens barrel comprises a flange part which is enlarged at a midway position in an optical axis direction.

11. The lens unit according to claim 1, wherein the tube part comprises a caulking part configured to press an object side lens of the plurality of the lenses, the object side lens being closest to the object side of the plurality of lenses, the caulking part being provided on an image side of the object side lens, and the caulking part pressing the object side lens in the optical axis direction.

12. An imaging device comprising:
a lens unit comprising:
a plurality of lenses; and
a lens barrel made of resin and comprising a tube part;
wherein a first press-fitted lens of the plurality of lenses comprises a first press-fitted portion that is press-fitted to the tube part;
wherein an outer peripheral face of the tube part comprises a thread groove;
wherein the tube part comprises a circular groove which is recessed from an image side end face of the tube toward an object side, the circular groove being formed between an inner peripheral face and the outer peripheral face of the tube part;
the first press-fitted portion is provided on an image side end of the first press-fitted lens; and
wherein an object side end of the circular groove is disposed on an object side of the first press-fitted portion;
a holder whose inner peripheral face is formed with a female screw engaged with the thread groove; and
an imaging element which is held on the image side with respect to the lens unit through the holder.

13. The imaging device according to claim 12, further comprising an elastic sealing member which is disposed in the circular groove,
wherein the elastic sealing member seals a space between a circuit board on which the imaging element is mounted and the circular groove.

14. A lens unit comprising:
a plurality of lenses; and
a lens barrel made of resin and comprising a tube part;
wherein a first press-fitted lens of the plurality of lenses comprises a first press-fitted portion that is press-fitted to the tube part;
wherein the tube part is fixed to another member by press-fitting;
wherein the tube part comprises a circular groove which is recessed from an image side end face of the tube toward an object side, the circular groove being formed between an inner peripheral face and the outer peripheral face of the tube part;
the first press-fitted portion is provided on an image side end of the first press-fitted lens; and
wherein an object side end of the circular groove is disposed on an object side of the first press-fitted portion.

15. An imaging device comprising:
a lens unit comprising:
a plurality of lenses; and
a lens barrel made of resin and comprising a tube part;
wherein a first press-fitted lens of the plurality of lenses comprises a first press-fitted portion that is press-fitted to the tube part;
wherein the tube part is fixed to another member by press-fitting;
wherein the tube part comprises a circular groove which is recessed from an image side end face of the tube toward an object side, the circular groove being formed between an inner peripheral face and the outer peripheral face of the tube part;
the first press-fitted portion is provided on an image side end of the first press-fitted lens; and
wherein an object side end of the circular groove is disposed on an object side of the first press-fitted portion;
a holder to which the tube part is press-fitted; and
an imaging element which is held on an image side with respect to the lens unit through the holder.

16. The lens unit according to claim 4, wherein
the cemented lens is located closest to the image side of the plurality of the lenses,
the first press-fitted lens is adjacent to the cemented lens on an object side of the cemented lens;
a diaphragm is provided between the cemented lens and the first press-fitted lens.

17. The lens unit according to claim 16, the object side end of the circular groove is disposed on an object side of a region where the thread groove is formed.

18. The lens unit according to claim 17, wherein
a thickness in a radial direction of the tube part is varied according to a position in an optical axis direction, and
a groove width of the circular groove is varied in the optical axis direction so that a wall thickness in the radial direction of a portion of the tube part located on an inner side in the radial direction of the circular groove and a wall thickness in the radial direction of a portion of the tube part located on an outer side in the radial direction of the circular groove are equal at any position in the optical axis direction.

19. The lens unit according to claim 1, wherein
the plurality of the lenses comprises, in order from the object side, a first lens having negative power, a second lens having negative power, a third lens having positive power, and a cemented lens having positive power,
the cemented lens comprises, in order from the object side, a fourth lens and a fifth lens which are plastic lenses,
the third lens is the first press-fitted lens;
the fourth lens of the cemented lens is press-fitted to the inner peripheral face of the tube part, and
the object side end of the circular groove is disposed on an object side of a press-fitted portion for the fourth lens.

20. The lens unit according to claim 19, further comprising a diaphragm located between the third lens and the fourth lens.

21. The imaging device according to claim 12, wherein
the first press-fitted lens is a cemented lens comprising plastic lenses joined to each other,
a diaphragm is provided between the cemented lens and a second press-fitted lens adjacent to the cemented lens,
the second press-fitted lens is press-fitted to the inner peripheral face of the tube part at a second press-fitted portion,
the object side end of the circular groove is disposed on an object side of the second press-fitted portion, and
when the female screw of the holder is engaged with the thread groove of the tube part to fix the lens barrel to the holder, a stress is hard to be applied to the cemented lens and the adjacent lens through the circular groove.

22. The imaging device according to claim 12, wherein
the plurality of the lenses comprises, in order from the object side, a first lens having negative power, a second lens having negative power, a third lens having positive power, and a cemented lens having positive power,
the cemented lens comprises, in order from the object side, a fourth lens and a fifth lens which are plastic lenses,
the third lens is the first press-fitted lens,
the fourth lens of the cemented lens is press-fitted to the inner peripheral face of the tube part,
when viewed in the direction perpendicular to the optical axis, the object side end of the circular groove is disposed on an object side of a press-fitted portion for the fourth lens,
when the female screw of the holder is engaged with the thread groove of the tube part to fix the lens barrel to the holder, a stress is hard to be applied to the fourth lens through the circular groove.

23. The imaging device according to claim 22, further comprising a diaphragm which is located between the third lens and the fourth lens;
wherein when the female screw of the holder is engaged with the thread groove of the tube part to fix the lens barrel to the holder, a stress is hard to be applied to the third lens and the fourth lens through the circular groove.

* * * * *

UNITED STATES PATENT AND TRADEMARK OFFICE
CERTIFICATE OF CORRECTION

PATENT NO. : 9,857,553 B2
APPLICATION NO. : 15/117543
DATED : January 2, 2018
INVENTOR(S) : Horiuchi et al.

It is certified that error appears in the above-identified patent and that said Letters Patent is hereby corrected as shown below:

On the Title Page

Item (72) Inventor is corrected to read:
-- Kohei Horiuchi, Nagano, (JP);
Tomoaki Nakajima, Nagano, (JP);
Toshio Shirotori, Nagano, (JP) --.

Signed and Sealed this
Seventeenth Day of September, 2019

Andrei Iancu
*Director of the United States Patent and Trademark Office*